INVENTORS: W. L. BOND
E. M. KELLY
BY
H. O. Wright
ATTORNEY

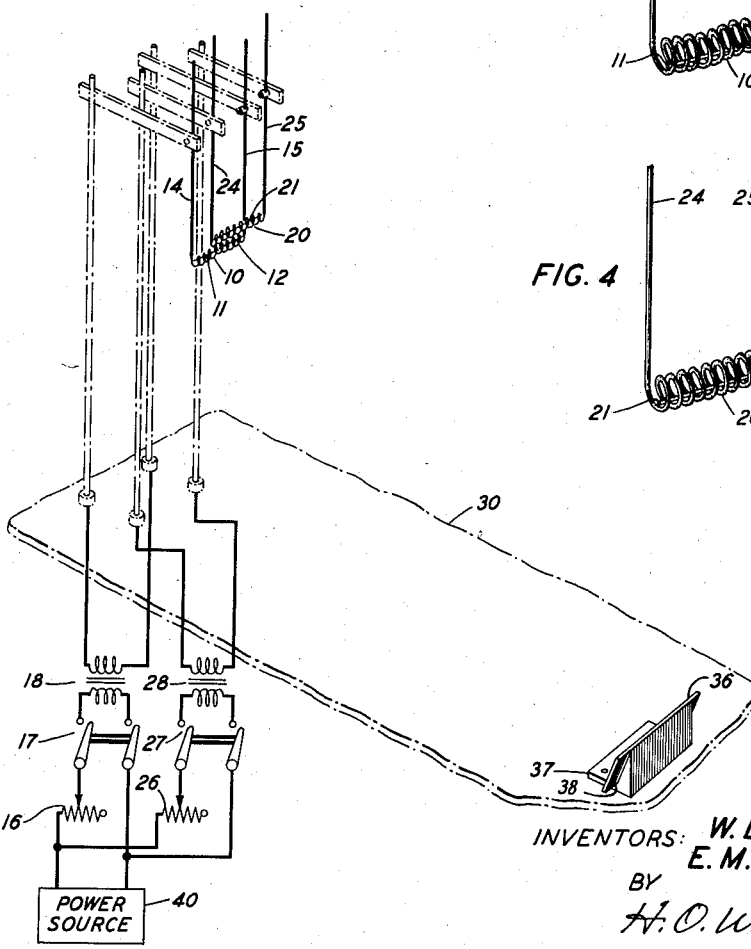

United States Patent Office 2,842,463
Patented July 8, 1958

2,842,463

VAPOR DEPOSITED METAL FILMS

Walter L. Bond, New Providence, and Edward M. Kelly, Summit, N. J., assignors to Bell Telephone Laboratories, Incorporated, New York, N. Y., a corporation of New York Application September 4, 1953, Serial No. 378,506

11 Claims. (Cl. 117—211)

This invention relates to coatings comprising conducting films, and more particularly, to adherent metallic films of high electrical conductivity, and high optical transparency.

For some time there has been a need for a highly transparent electrically conductive film suitable for deposit on glass, crystalline, or plastic materials for various practical applications, such as electro-optical light valves, antistatic windows in sensitive electrical instruments, and deicers on airplane and car windows.

The most important examples of prior art films developed for these various types of applications are those consisting solely of evaporated gold, or of various metallic oxides which are applied in some cases by spraying them on the surface to be coated when the latter is in a red-hot condition. Although such films have resistances as low as 50 to 30 ohms per square unit of area (per square centimeter, for example) their optical transmissions are usually only about 70 percent or less.

Moreover, they involve certain other disadvantages. For example, the heating of the surface to be coated to a red heat, or other treatment such as would be required for application thereto of metallic oxides, is usually inconvenient and indeed not always practicable.

Films consisting entirely of gold, on the other hand, as obtained by known prior art processes, produce undesirable color components in the transmitted light.

Furthermore, purely gold films having higher optical transmissions than 70 percent are not reproducible by prior art processes with any degree of certainty or precision inasmuch as, in such films, the gold atoms tend to agglomerate, forming a film which is thick in some spots and thin in others. Hence, upon aging prior art, purely gold, films become discontinuous, with the result that their resistances rapidly increase, frequently to such a degree that they become substantially non-conductive.

Accordingly, the principal object of this invention is to increase simultaneously the electrical transmission, the optical transparency and the time-stability of adherent metallic films.

Other more specific objects of the invention are to make films of high electrical transmission and high optical transparency which are simpler to apply to the substrate, and more readily reproducible, then similarly characterized films of the prior art.

Another object of the invention is to provide films characterized as above which have a substantially flat response over the visible range of frequencies.

In accordance with the present invention, these and other objects are attained by means of a vapor-deposited film a few atomic layers thick consisting preferably of a mixture of three metals, one of which is miscible with both of the other two, which latter two have no mutual affinity (i. e., the "other two" are mutually immiscible). The three metals are applied to the substrate surface, i. e., the surface of the object to be coated, by successive evaporation. Preferably, the first applied or undercoating metal, which should also be the metal which is miscible with the other two, bonds strongly with the oxygen in the substrate surface or surface to be coated The substrate surface may comprise a surface of glass, crystal, plastic, or some similar material. The second, or intermediate, metal to be applied is miscible with the undercoating metal, but non-miscible with the third or outermost coating material, the latter being a good conductor of electricity. Because of the non-miscible relationship between the intermediate and outermost components, the metallic atoms of these components spread themselves more uniformly over the undercoating material and the substrate surface; the tendency to agglomeration being thereby greatly reduced. Although the resultant film is only a few atomic layers thick (probably less than 50), it is substantially even and continuous and is characterized by a relatively low resistance.

For specific example, an adherent film which gives optimum performance for the purposes of the present invention contains 20 percent of aluminum, 30 percent of titanium, and 50 percent of gold (all by volume), which three metals are evaporated onto the substrate surface substantially in the order named in layers each a few atoms thick. After aging, by heat treatment at 135 degrees C for 15 minutes, properly applied films of the aforesaid composition have resistances within the range 33.9 to 41.3 ohms per square unit of area, for example per square centimeter, and percentages of light transmission within the range 84–88.

Other combinations which give satisfactory performance for the purposes of the present invention contain various amounts of aluminum and titanium ranging from a combination containing 10 percent by volume of aluminum with 40 percent by volume of titanium to one containing 25 percent by volume of aluminum with 25 percent by volume of titanium. The combinations within the range just indicated include 50 percent gold by volume in each case.

Other objects, advantages, and features of the present invention will be apparent from a study of the specification hereinafter and the attached drawings in which:

Figs. 1A, 1B, and 1C are enlarged detailed diagrammatic showings of the three progressive stages, respectively, in the deposition of a film of the present invention;

Fig. 2 is a perspective diagrammatic showing of particular arrangements included in a specific apparatus suitable for deposition of films in accordance with the present invention;

Figs. 3 and 4 are more detailed showings of the filaments 10, 20, of Fig 2, containing the charges to be evaporated in the apparatus diagrammatically indicated in Fig. 2;

Figure 6:
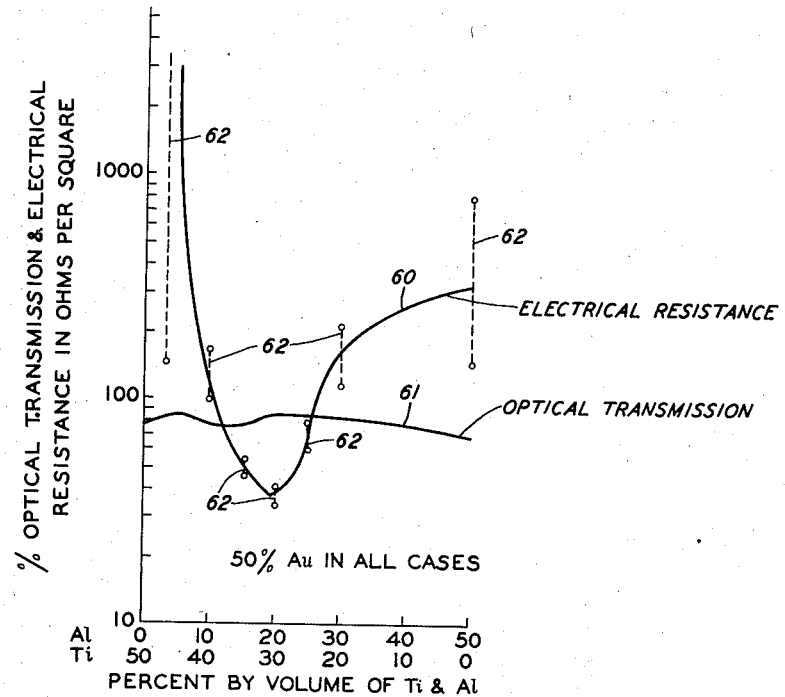
Figure 7:
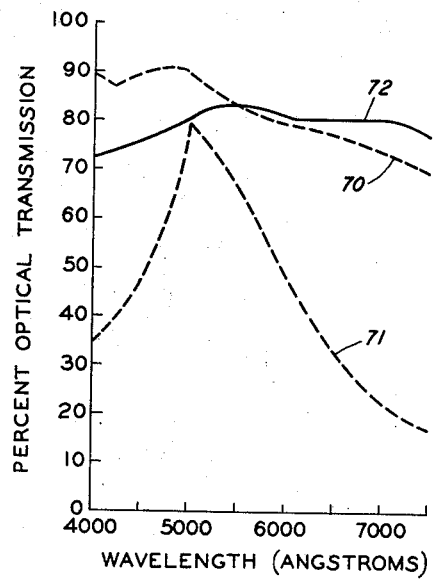

Fig. 6 shows graphs of the optical transmission and the resistance in ohms per square unit of area for film compositions in accordance with the present invention, containing 50 percent gold, by volume, and graduated percentages, by volume of titanium and aluminum; and Fig. 7 shows graphs of the percentages of light transmission plotted against wavelength for a film of the present invention and for two, particularly designated, prior art films.

A proposed theory in explanation of the operation of the present invention is illustrated diagrammatically by Figs. 1A, 1B and 1C of the accompanying drawings and is as follows.

Aluminum, which, as a purely incidental though in the present instance a favorable factor, has the lowest boiling point of the metals utilized, has been arranged to evaporate first. As will became apparent during the description of the apparatus illustrated by Fig. 2, a metal having a higher boiling point than the others could be evaporated first by simply providing an independently controllable heating arrangement for it. Because of the remarkable affinity of aluminum for oxygen, the aluminum atoms, represented by the clear circles 102 in Fig. 1A of the drawings, form oxides with the oxygen in the substrate 100 upon impinging upon the upper surface 101 to be coated with a film of the invention. Hence, the aluminum atoms 102 tend to adhere firmly to the surface 101 of the substrate 100 at the points upon which they first impinge, thus acting as anchors, or bonding particles, to hold the later-applied titanium atoms in place.

Since titanium is desired as the intermediate material of the film, it is evaporated after the aluminum. Titanium, being miscible with aluminum, the titanium atoms, as represented by the cross-hatched circles 103 of Fig. 1B of the drawings, tend to cling to the aluminum atoms. The titanium atoms, being more numerous than the aluminum atoms in the preferred mixture, will tend to stick on the top and sides of the aluminum atoms.

At this stage of deposition in accordance with the present invention, connecting interstices still exist between the titanium atoms. Hence, when the gold atoms, which are last to be evaporated, arrive at the surface, these connecting interstices are filled, inasmuch as no affinity exists between the gold and titanium atoms. Furthermore, since the preferred mixture contains 50 percent of gold by volume, the gold atoms will be much more numerous than either the aluminum or titanium atoms and will form the upper layer required for high conductivity, as indicated by the blacked-in circles 104 in Fig. 1C of the drawings.

In general, the evaporation process may be carried out in the manner described in the copending application Serial No. 316,525, filed October 23, 1952, by applicant W. L. Bond, now matured into Patent 2,724,663, granted November 22, 1955. All portions of applicant Bond's just-mentioned copending application which are pertinent to the present application are incorporated herein and made a part of the present application by reference. More particularly, for the purpose of simplifying the accompanying drawings and the description of the present application, certain of the components which are described in detail in the above-named copending application are to be presumed to be present in the apparatus under description, although not herein illustrated. These components include the surrounding vacuum chamber and its associated pumping equipment which function in a conventional manner to reduce the vaporization chamber to an internal pressure sufficiently below atmospheric level to suitably reduce interference from air molecules encountered in the paths of the radiated metallic ions. A suitable pressure for the present operation is $2 \times 10^{-5}$ millimeters of mercury. Another element of the vapor-deposition apparatus not herein shown, but described in detail in the copending application Serial No. 316,525, supra, is a glow discharge electrode and associated circuit arrangement which serves as a source of ionic discharge for cleaning the surface of the substrate after it has been washed with soap and water, and prior to the application of the metallic coating, all as described in detail in said copending application.

The apparatus of Fig. 2 of the drawings shows a preferred arrangement, to be used within the evacuated vapor-deposition chamber of said copending application, for producing films in accordance with the present invention. The dimensions, particularly those shown more specifically in Fig. 5, and forms of the component elements of the apparatus described, while not critical, are such as to combine in a workable manner to produce the subject films.

The apparatus shown in Fig. 2 includes a pair of filaments which function to hold the evaporants during the vapor deposition process. These comprise the double-sag, or cradle, filament 10, indicated in detail in Fig. 3, which holds both the aluminum and titanium charges 11 and 12, in adjacent portions thereof, and a separate single-sag filament 20 indicated in detail in Fig. 4, which holds the gold charge 21.

The filament 10 consists essentially of a stranded tungsten wire of the kind generally used for open electrical coils in evaporating apparatus. In a typical arrangement, filament 10 functions as a double sag, or cradle, for the titanium and aluminum charges to be evaporated, and may comprise strands of 15 mil tungsten wire wound together to produce a wire having an overall outer diameter of 40 mils. This is formed into a helix 1.5 centimeters long, with an inner diameter of about 90 mils, which is slightly bent from the cylindrical shape to form two sags of about six loops each, as indicated in Fig. 3. The lead wires 14 and 15 extend about 5 centimeters from the supporting structure in a direction normal to the principal axis of the helix.

The structure of the filament 20, indicated in Fig. 4, which serves as a single sag or cradle for the gold charge to be evaporated, consists of a helical coil conventionally wound to include but a single sag or cradle of about a dozen loops, but is otherwise similar to the filament 10.

Figure 5:
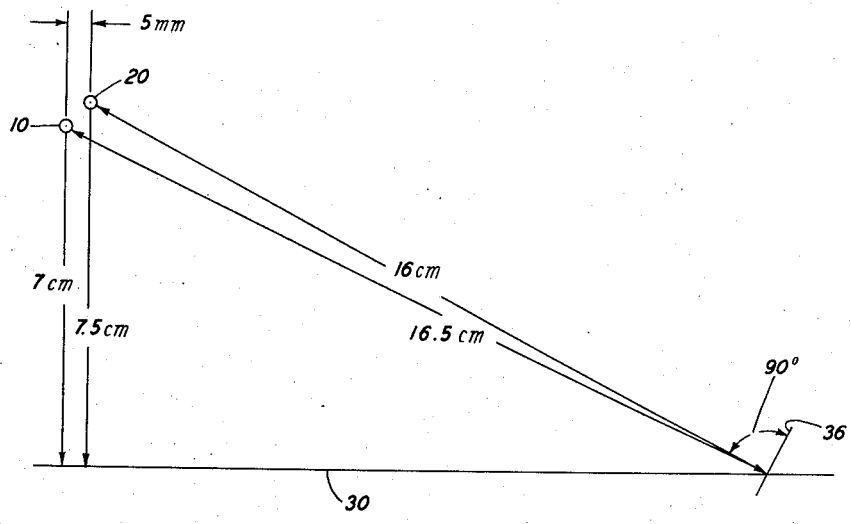
Fig. 5 is a diagram relating to particular dimensions appropriate for the apparatus indicated in Fig. 2.

As indicated in the dimensional diagram of Fig. 5, filaments 10 and 20 are supported above the operating plane 30 at heights of 7 and 7.5 centimeters, respectively, with their respective central points at distances of 16 and 16.5 centimeters from the center of the substrate surface 36 to be coated. The substrate body 38 is mounted in the support at such an angle that the major face 36 to be coated is substantially perpendicular to diagonal lines extended from the centers of filaments 10 and 20 to the center of surface 36 which is substantially parallel to the major axes of the coils of these filaments. The centers of filaments 10 and 20 are aligned with the center of the surface 36 in the plane of Fig. 5 in which filament 10 is shown to be 5 milimeters below and 5 milimeters behind filament 20 in a horizontal direction. The separation between the filaments, while not critical, should be sufficient so that one does not interfere with the vapor deposition of the other, but not so great that the resultant coatings on the surface 36 are appreciably uneven.

In order to obtain a substantially uniform coating distribution on the substratum, that is, on a surface to be coated, it is best that the internal diameter of the filament coils supporting the charge be restricted to a minimum to hold the required load of material to be evaporated. Although the ratio of the internal diameter of filament coins to the cross-sectional diameter of the load is not critical, it should be small enough so that sufficient evaporant is provided to uniformly wet the filament coils, thereby facilitating uniform evaporation on the substrate. The above indicated internal diameters of filaments and the loads substantially conform with this desideratum.

The pairs of lead wires 14, 15 and 24, 25 to respective filaments 10 and 20 are held in place by any suitable means, such as the clamping arrangement shown by the dotted lines. Filaments 10, 20 are separately energized by the power source 40, which is connected through parallel circuits including the rheostats 16, 26, switches 17, 27, and transformers 18, 28, respectively. It is necessary that the power source 40 deliver enough current to heat the filaments 10 and 20 to the desired evaporation temperatures of the metals involved. This will usually require from 20 to 30 amperes for each filament. One skilled in the art can, by observation, readily determine when the process is proceeding satisfactorily.

Assume as a typical example that the coating to be supplied comprises an undercoating of aluminum topped by an intermediate stratum of titanium and an outer coating of gold, the entire coating having an approximate thickness of 50 Angstroms and the component layers having respective thicknesses of substantially 10, 15 and 25 Angstroms. The amounts of charge suitable for producing a coating of the composition named may be computed in a manner well known in the art and described in detail, for example, in application Serial No. 316,525, supra. For the present preferred illustrative embodiment, the amounts and disposal of the evaporant materials are as follows: 7.5 millimeters of 10 mil titanium wire, 11, (Fig. 3 and 7.5 millimeters of 10 mil aluminum wire, 12, (Fig. 3) are placed end to end in the bottom of filament 10; and 15 millimeters of 10 mil gold wire, 21, (Fig. 4) is placed flat in the bottom of filament 20.

The evaporating process is carried out as follows. During the first 5 or 10 seconds after closure of the switch 17, the rheostat 16 is adjusted to permit passage of current of the order of 10 amperes in the filament 10, so that the filament rapidly heats up to a temperature slightly above the melting points of both aluminum and titanium. The temperature is substantially uniform along the filament 10 before low resistance contact is made by the melting of the coating metals, and may be, for example, of the order of 900 degrees Kelvin. During this period, the operator observes the process through a window in the vacuum chamber, noting that the metallic elements 11 and 12 melt, wetting and coating their respective separate portions of the surface of the tungsten filament 10. When this part of the procedure is completed, the rheostat 16 is then adjusted to permit the passage of a much higher current, of the order of from 20 to 30 amperes, in the filament 10, thereby bringing the two parts of the filament to temperatures above, say, 2000 degrees Kelvin for a period of about 10 seconds, during which interval first the aluminum and then the titanium are vapor-deposited on the surface 36, in somewhat overlapping order. In a similar manner, the switch 27 is closed and the rheostat 26 adjusted to permit passage of a current in the order of 10 amperes in filament 20, causing the gold charge 21 to heat up and melt, wetting the surface of the filament in the manner previously described. After the initial stage, the rheostat 26 is adjusted to permit the passage of a much higher current, and effect the vapor-deposition of the gold charge onto the surface 36 subsequent to the above-described deposits of aluminum and titanium.

The total thickness of the coating produced on the substrate surface 36 may be of the order of 50 Angstroms which would correspond to approximately 25 atomic layers. The film of the present preferred illustrative embodiment, which is produced by the amounts of charge named, contains substantially 20 percent of aluminum, 30 percent of titanium, and 50 percent of gold, all by volume. Prior to aging, such a coating exhibits a resistance within the range of 39.2 to 82.5 ohms per square unit of area, and an optical transmission within the range of 71 to 74 percent. After a coating of the composition described is aged by heat treatment at 135° C. for 15 minutes, its performance is improved so that it exhibits a resistance of from 33.9 to 41.3 ohms per square unit of area and from 84 to 88 percent optical transmission.

The following table shows the resistance per square unit area and percentage optical transmission of composite films of varying amounts of aluminum and totanium, with fifty percent of gold, all by volume, in accordance with the present invention, before and after aging, as obtained by testing actual sample films.

Table

[Composite films of aluminum, titanium and gold. Estimated total thickness: 40 to 50 Angstroms. All measurements made at room temperature. Films aged by heating at 135° C. for 15 minutes.]

| Compositions—Component Percentages | Sample No. | Before aging | | After aging | |
|---|---|---|---|---|---|
| | | Resistance per square (ohms) | Percentage transmission | Resistance per square (ohms) | Percentage transmission |
| (20 Al, 30 Ti, 50 Au) | 1 | 82.5 | 74 | 37.0 | 86 |
| | 2 | 76 | 71 | 39.1 | 84 |
| | 3 | 58.7 | 75 | 41.3 | 84 |
| | 4 | 39.2 | 73 | 33.9 | 88 |
| (25 Al, 25 Ti, 50 Au) | 1 | 113 | 68 | 60.9 | 83 |
| | 2 | 109 | 68 | 78.2 | 80 |
| (30 Al, 20 Ti, 50 Au) | | 348 | 68 | 213 | 83 |
| (50 Al, 0 Ti, 50 Au) | | 330 | 56 | 300 | 68 |
| (15 Al, 35 Ti, 50 Au) | 1 | 78.4 | 70 | 52 | 82 |
| | 2 | 56.5 | 73 | 47.9 | 75 |
| (10 Al, 40 Ti, 50 Au) | 1 | 109 | 78 | 104 | 82 |
| | 2 | 138 | 72 | 165 | 75 |
| (5 Al, 45 Ti, 50 Au) | | 174 | 77 | 3,200 | 85 |

These values are plotted in Fig. 6 of the drawings. The solid curves 60 and 61 represent the average results of various measurements of electrical resistance per square unit of area and percentage optical transmission for the different compositions respectively. The vertical dotted lines 62 are intended to indicate the rate or precision of reproducibility for each. It is apparent that optimum values of low electrical resistance and high optical transmission are attained by using substantially 20 percent aluminum and 30 percent titanium, together with 50 percent gold, all by volume. Further, it has been found that the combination last named can be reproduced within much closer tolerances than any of the others indicated. When compared to the optimum combination, the reproducibility of the other combinations becomes gradually decreased at the extreme portions of the selected range for the aluminum and titanium components. The curves indicated in Fig. 6 are based on measurements made at room temperature, after aging of the coatings to produce resistance and transmission values which remain stable with time.

Fig. 7 is a comparative showing of percentage of light transmission for a film within the range of compositions disclosed in accordance with the present invention, as contrasted with certain prior art films. Curve 70 represents a first prior art film composed of a tin oxide applied by spraying on red hot glass, a curve 71 corresponds to a prior art all-gold film having a thickness of 50 Angstroms, whereas 72 represents a film within the range of composition herein disclosed which contains substantially 25 percent aluminum, 25 percent titanium, and 50 percent gold, all by volume. It is apparent that the latter is characterized by a considerably flatter response than the others over the visible light range extending roughly from 4000 to 7500 Angstroms, and would hence be superior for most practical applications.

It will be apparent to those skilled in the art that the principles of the present invention may be applied to films of other combinations than those specifically disclosed herein for the purpose of illustration. These include, in combination with an aluminum undercoating, such relatively immiscible combinations as iron and silver, cobalt and silver, nickel and silver, titanium and zinc, and cobalt and copper.

What is claimed is:

1. In combination with a hard, smooth, transparent, non-metallic substrate, an adherent vapor-deposited metallic coating less than about 100 Angstroms thick consisting of substantially 20 percent by volume of aluminum, 30 percent by volume of titanium, and 50 percent by volume of gold, wherein the aluminum forms a base layer in contact with said substrate, said gold forms the outermost layer, and said titanium is interposed between said base layer and said outermost layer.

2. In combination with a hard, smooth, non-metallic, transparent substrate, an adherent vapor-deposited metallic coating less than about 100 Angstroms thick consisting of about 50 percent by volume of gold, and amounts by volume within the range from 15 percent of aluminum with 35 percent of titanium, to 25 percent of aluminum with 25 percent of titanium, wherein said aluminum forms the base layer, said gold layer is outermost, and said titanium layer is interposed between said base layer and said outermost layer.

3. The method of forming on the surface of a hard, smooth, transparent substrate comprising a dielectric material containing a substantial component of oxygen, a time-stable coating less than about 100 Angstroms thick, having an optical transparency of between about 70 and 90 percent, and an electrical resistance of less than about 100 ohms per square, which comprises the steps of depositing by evaporation on said surface, a first layer of aluminum, a few atoms thick, depositing by evaporation on said surface and said first layer, a second slightly thicker layer of titanium, depositing by evaporation on said surface and said first two layers a third layer of gold which approximates the combined thickness of said first and second layers.

4. A method in accordance with claim 3 in which said coating comprising said first, second and third layers, is heat treated at a temperature of 135° C. for a period of substantially fifteen minutes.

5. In combination with a hard, smooth, non-metallic, transparent substrate, an adherent metallic coating less than about 100 Angstroms thick, consisting of 50 percent by volume of gold, and the remaining proportion by volume consisting essentially of aluminum and titanium, wherein said aluminum forms the base layer, said gold layer is outermost, and said titanium layer is interposed between said base layer and said outermost layer.

6. In combination with a hard, smooth, transparent substrate containing a substantial component of oxygen, a coating less than 100 Angstroms thick applied to a surface thereof, said coating comprising, in substantial proportions, a first metal layer forming a base layer which bonds well with the oxygen of said substrate, and a second and a third metal layer deposited in the order named on said base layer, each of said last-named metals being miscible with said first metal, but mutually immiscible, the first layer being of aluminum, the second layer comprising a metal selected from the group consisting of iron, cobalt and nickel, and the third layer being of silver.

7. A combination in accordance with claim 6 in which said coating comprising said first, second and third layers is heat treated at a temperature of 135° C. for a period of substantially fifteen minutes.

8. In combination with a hard, smooth, transparent substrate containing a substantial component of oxygen, a coating less than 100 Angstroms thick applied to a surface thereof, said coating comprising, in substantial proportions, a first metal layer forming a base layer which bonds well with the oxygen of said substrate, and a second and a third metal layer deposited in the order named on said base layer, each of said last-named metals being miscible with said first metal, but mutually immiscible, the first layer being of aluminum, the second of titanium, and the third being selected from the group consisting of gold and zinc.

9. A combination in accordance with claim 8 in which said coating comprising said first, second and third layers is heat treated at a temperature of 135° C. for a period of substantially fifteen minutes.

10. In combination with a hard, smooth, transparent substrate containing a substantial component of oxygen, a coating less than 100 Angstroms thick applied to a surface thereof, said coating comprising, in substantial proportions, a first metal layer forming a base layer which bonds well with the oxygen of said substrate, and a second and a third metal layer deposited in the order named on said base layer, each of said last-named metals being miscible with said first metal, but mutually immiscible, the first layer being of aluminum, the second layer of cobalt, and the third layer being selected from the group consisting of silver and copper.

11. A combination in accordance with claim 10 in which said coating comprising said first, second and third layers is heat treated at a temperature of 135° C. for a period of substantially fifteen minutes.

References Cited in the file of this patent

UNITED STATES PATENTS

| | | |
|---|---|---|
| 2,021,661 | Kisfaludy | Nov. 19, 1935 |
| 2,047,351 | Alexander | July 4, 1936 |
| 2,239,452 | Williams et al. | Apr. 22, 1941 |
| 2,383,311 | Hein | Aug. 21, 1945 |
| 2,497,666 | Gravley | Feb. 14, 1950 |